(12) United States Patent
Schmidt-Langhorst et al.

(10) Patent No.: US 11,695,482 B2
(45) Date of Patent: Jul. 4, 2023

(54) POLARIZATION-DIVERSITY KRAMERS-KRONIG HETERODYNE RECEIVER AND METHOD

(71) Applicant: Fraunhofer-Gesellschaft zur Foerderung der angewandten Forschung e.V., Munich (DE)

(72) Inventors: Carsten Schmidt-Langhorst, Berlin (DE); Robert Elschner, Berlin (DE); Robert Emmerich, Berlin (DE); Isaac Sackey, Berlin (DE); Patrick Runge, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 24 days.

(21) Appl. No.: 17/488,040

(22) Filed: Sep. 28, 2021

(65) Prior Publication Data

US 2022/0094439 A1    Mar. 24, 2022

Related U.S. Application Data

(63) Continuation of application No. PCT/EP2020/059840, filed on Apr. 7, 2020.

(30) Foreign Application Priority Data

Apr. 15, 2019   (EP) ..................................... 19169281

(51) Int. Cl.
*H04B 10/61*   (2013.01)
*H04B 10/64*   (2013.01)

(52) U.S. Cl.
CPC ......... *H04B 10/612* (2013.01); *H04B 10/614* (2013.01); *H04B 10/64* (2013.01)

(58) Field of Classification Search
CPC ..... H04B 10/612; H04B 10/614; H04B 10/64
(Continued)

(56) References Cited

U.S. PATENT DOCUMENTS

2016/0212003 A1*   7/2016   Chen ................. H04L 25/03343
2020/0028592 A1*   1/2020   Chen ..................... H04B 10/69

FOREIGN PATENT DOCUMENTS

WO       2017212492 A1    12/2017
WO    WO-2017212492 A1 * 12/2017   ........... H04B 10/614

OTHER PUBLICATIONS

Antonio et al; Kramers-Kronig coherent receiver; Nov. 2016; Optical Society of America; pp. 1-8. (Year: 2016).*

(Continued)

*Primary Examiner* — Amritbir K Sandhu
(74) *Attorney, Agent, or Firm* — Perkins Coie LLP; Michael A. Glenn

(57) ABSTRACT

An apparatus includes an input receiving a modulated optical data signal having components of at least first and second polarizations, a first optical detector receiving the data signal, the first optical detector being first polarization-selective or first polarization-sensitive, passing components of the data signal having the second polarization, and outputting a first electrical signal, a second optical detector coupled to the first optical detector to receive the components of the data signal having the second polarization, and outputting a second electrical signal, and a processor applying a Kramers-Kronig process to the first and second electrical signals, and outputting the data signal using the Kramers-Kronig processed first and second electrical signals. A combiner is connected between the input and the first optical detector and combines the data signal with an (Continued)

unmodulated optical signal such that the unmodulated optical signal serves as a Kramers-Kronig carrier for the first and second polarizations.

13 Claims, 10 Drawing Sheets

(58) Field of Classification Search
USPC .......................................................... 398/205
See application file for complete search history.

(56) References Cited

OTHER PUBLICATIONS

Li et al; Joint Optimization of Resampling Rate and Carrier-to-Signal Power Ratio in Direct-Detection Kramers-Kronig Receivers; 2017; Optical Networks Group, Department of Electronic & Electrical Engineering, UCL; pp. 1-3. (Year: 2017).*

Cristian et al; Kramers Kronig PAM transceiver and two-sided polarization-multiplexed Kramers Kronig transceiver; Nov. 2017; pp. 1-8. (Year: 2017).*

Che et al; Direct detection of optical field beyond single polarization mode; Feb. 2018;Optics Express; pp. 1-13. (Year: 2018).*

Antonelli et al Polarization Multiplexing with the Kramers-Kronig Receiver; Dec. 2017; Journal of Lightwave Technology, vol. 35, No. 24; pp. 1-7. (Year: 2017).*

Chen, X., et al., "4×240 GB/s dense WDM and PDM Kramers-Kronig detection with 125-km SSMF transmission", Proc 43rd European Conference on Optical Communication (ECOC 2017), Gothenburg, Sweden.

Deri, R. J., et al., "Ultracompact Monolithic Integration of Balanced, Polarization Diversity Photodetectors for Coherent Lightwave Receivers", IEEE Photonics Technology Le'lters, vol. 4, No. 11, Nov. 1992, pp. 1238-1240.

Li, Z , et al., "Joint optimization of resampling rate and CSPR in direct-detection transmission over a single span of 200 km", Proc 43rd European Conference on Optical Communication (ECOC 2017), Gothenburg, Sweden.

* cited by examiner

POLARIZATION-DIVERSITY KRAMERS-KRONIG HETERODYNE RECEIVER AND METHOD

CROSS-REFERENCES TO RELATED APPLICATIONS

This application is a continuation of copending International Application No. PCT/EP2020/059840, filed Apr. 7, 2020, which is incorporated herein by reference in its entirety, and additionally claims priority from European Application No. EP 19169281.3, filed Apr. 15, 2019, which is incorporated herein by reference in its entirety.

The present invention relates to the field of optical data transmission, more specifically to processing an optical data signal having multiple polarizations for obtaining the data carried by the optical signal. Embodiments concern an integrated polarization-diversity Kramers-Kronig, KK, heterodyne receiver.

BACKGROUND OF THE INVENTION

For example, a data center interconnect (DCI) involves high-capacity and yet simple and cost-efficient transceivers with a small footprint for typical transmission distances in the order of 100 km. To this end, the Kramers-Kronig (KK) receiver concept (see reference [1]) may be used, which allows to receive broad-band quadrature-amplitude modulated (QAM) signals with a direct detection receiver (see reference [2]) while efficiently mitigating distortions from signal-signal beating interference (SSBI).

Reference [3] and WO 2017/212492 A1 illustrate a dual-polarization (DP) KK-receiver that allows to further double the spectral efficiency and avoid any analog polarization tracking of the received signal. The DP-KK receiver optics is implemented as polarization-diversity setup with two individual photodiodes connected to a polarization beam splitter (PBS). FIG. 1 schematically illustrates such a conventional architecture of a polarization-diverse Kramers-Kronig heterodyne receiver 100. The receiver 100 includes an input 102 receiving an optical signal having multiple polarizations, e.g., an optical dual polarization (DP) signal 104 carrying the data. The PBS 106 splits the received optical dual polarization signal 104 into two separate branches 108a and 108b which carry the horizontal polarization component H and the vertical polarization component V of the received signal 104, respectively. Each of the branches 108a and 108b includes an optical coupler 110a and 110b receiving the horizontal polarization component H and the vertical polarization component V of the received signal 104, respectively. The optical couplers 110a and 110b further receive two copies of an unmodulated optical light of a local oscillator laser (LO) and combine them with the H and V components of the received signal 104. The two combined optical signals output by the optical couplers 110a and 110b are converted to two electrical analog signals H-Pol and V-Pol using two photodetectors PD #1 and PD #2. The electrical analog signals H-Pol and V-Pol are converted into the digital domain using respective analog-digital converters 112a, 112b, and the respective digital signals 114a, 114b are supplied to a processor 116. The processor performs a KK processing and a digital signal processing, DSP. The respective digital signals 114a and 114b are processed using one or more KK processes or algorithms. Based on the KK processed digital signals the DSP creates and outputs the data signal 118.

Such a conventional architecture, however, comprises a discrete PBS to separate the polarization components as well as separate optical couplers for combining the respective H and V components of the received signal with the LO signal, thereby increasing the footprint of the receiver.

It is noted that the information in the above section is only for enhancing the understanding of the background of the invention and therefore it may contain information that does not form conventional technology that is already known to a person of ordinary skill in the art.

Starting from conventional technology as described above, there may be a need for improvements of a polarization-diversity Kramers-Kronig, KK, heterodyne receiver and a polarization-diversity KK heterodyne receiving method.

SUMMARY

According to an embodiment, an apparatus may have: an input configured to receive a modulated optical data signal, the modulated optical data signal including components of a plurality of polarizations, the plurality of polarizations including at least a first polarization and a second polarization, a first optical detector coupled to the input to receive the modulated optical data signal, wherein the first optical detector is polarization-selective or polarization-sensitive to the first polarization and passes components of the modulated optical data signal having the second polarization, and wherein the first optical detector is configured to output a first electrical signal, a second optical detector coupled to the first optical detector to receive from the first optical detector the components of the modulated optical data signal having the second polarization, wherein the second optical detector is configured to output a second electrical signal, and a processor, the processor configured to
apply a Kramers-Kronig, KK, process to the first electrical signal and to the second electrical signal, and output the data signal using the KK processed first and second electrical signals, wherein a combiner, like an optical coupler, is connected between the input and the first optical detector, the combiner configured to combine the modulated optical data signal with an unmodulated optical signal such that the unmodulated optical signal serves as a KK carrier for the first and second polarizations.

According to another embodiment, a method may have the steps of: receiving a modulated optical data signal, the modulated optical data signal including components of a plurality of polarizations, the plurality of polarizations including at least a first polarization and a second polarization, combining the modulated optical data signal with an unmodulated optical signal such that the unmodulated optical signal serves as a Kramers-Kronig, KK, carrier for the first and second polarizations, applying the modulated optical data signal to a first optical detector to obtain a first electrical signal, the first optical detector being polarization-selective or polarization-sensitive to the first polarization and passing components of the modulated optical data signal having the second polarization, applying the components of the modulated optical data signal having the second polarization from the first optical detector to a second optical detector to obtain a second electrical signal, applying the first electrical signal to a first Kramers-Kronig, KK, receiver and the second electrical signal to a second KK receiver, and processing signals form the first and second KK receiver to output the data.

In accordance with embodiments (see for example claim 2) the combiner is configured to combine the modulated optical data signal with an unmodulated optical signal under a predefined polarization angle, e.g., 45°, with respect to the first and second polarizations such that an intensity or a power of the unmodulated optical signal is substantially the same for the first and second polarizations.

In accordance with embodiments (see for example claim 3) the apparatus comprises a local optical source connected to the combiner and configured to provide the unmodulated optical signal.

In accordance with embodiments (see for example claim 4) the second optical detector is polarization selective or polarization insensitive to the second polarization.

In accordance with embodiments (see for example claim 5) the apparatus comprises a waveguide-integrated polarization-selective dual-photodetector chip including the first and second optical detectors, like photodiodes.

In accordance with embodiments (see for example claim 6) the combiner is configured to combine the modulated optical data signal with the unmodulated light under a predefined polarization angle, like 45°, with respect to the waveguide polarization axes of a waveguide-integrated polarization-selective dual-photodetector chip.

In accordance with embodiments (see for example claim 7)
the first optical detector includes a first detector, like a photodiode, outputting a first signal and a second detector, like a photodiode, outputting a second signal,
the second optical detector includes a third detector, like a photodiode outputting a third signal, and a fourth detector, like a photodiode, outputting a fourth signal,
the first detector and the second detector are connected in a balanced configuration to subtract the first signal and the second signal so as to provide the first electrical signal,
the third detector and the fourth detector are connected in a balanced configuration to subtract the third signal and the fourth signal so as to provide the second electrical signal, and
the combiner for combining the modulated signal with the unmodulated signal is configured to have two outputs each feeding the first and third detectors and the second and fourth detectors, respectively.

In accordance with embodiments (see for example claim 8) the apparatus comprises
a first waveguide-integrated polarization-selective dual-photodetector chip including the first and third detectors, like photodiodes, and
a second waveguide-integrated polarization-selective dual-photodetector chip including the second and fourth detectors, like photodiodes,
wherein the combiner having two outputs is connected to the first and second waveguide-integrated polarization-selective dual-photodetector chips, respectively.

In accordance with embodiments (see for example claim 9) the combiner is configured to combine the modulated optical data signal with the unmodulated light under a predefined polarization angle, like 45°, with respect to the waveguide polarization axes of a first and second waveguide-integrated polarization-selective dual-photodetector chip.

In accordance with embodiments (see for example claim 10) the first polarization is a horizontal polarization or a transverse electric polarization, and the second polarization is a vertical polarization or a transverse magnetic polarization.

In accordance with embodiments (see for example claim 11) the first electrical signal and the second electrical signal are analog signals, and the apparatus includes a first analog-digital-converter connected between the first optical detector and the first KK receiver, and a second analog-digital-converter connected between the second optical detector and second first KK receiver.

In accordance with embodiments (see for example claim 12) the signal processor is configured to apply a coherent dual-polarization digital signal processing to the signals from the first and second KK receivers, and wherein the digital signal processing may include one or more of the following:
polarization separation,
a channel estimation, e.g., blind or data-aided,
a multiple-input-multiple-output, MIMO, equalization, e.g. in the time domain or in the frequency domain,
a carrier phase recovery, e.g., a blind phase search or a Viterbi-Viterbi phase recovery,
a compensation of residual modulator I/O imbalances and phase errors using a real-valued MIMO time-domain equalizer,
a symbol-to-bit de-mapping.

The inventive approach provides a dual polarization Kramers-Kronig (KK) receiver architecture with a significantly reduced footprint, based on two concatenated polarization-selective photodiodes without the need for a PBS. According to the present invention a modulated input optical data signal is optically mixed with an unmodulated local oscillator, LO, light so as to increase the reception sensitivity for the input optical data signal because the analog electrical signal produced by the photodetector is proportional to the product of the LO field and the input optical data signal field. In a Kramers-Kronig heterodyne arrangement, the LO light has an optical frequency offset with respect to the optical carrier frequency of the input optical data signal. As the mixing process in the photodetector involves that the input optical data signal and the LO light are of the same optical polarization, the Kramers-Kronig heterodyne setup is inherently polarization sensitive, and the present invention provides a polarization-diversity setup, e.g., for dual-polarization (DP) input optical data signals.

Embodiments of the present invention provide an integrated dual-polarization Kramers-Kronig (DP-KK) receiver architecture using a photonic-integrated chip comprising two serially cascaded polarization-selective photodiodes. In accordance with embodiments, the integrated DP-KK receiver architecture may use an indium phosphide photonic-integrated circuit (InP PIC) allowing the reception of a polarization-scrambled signal, like a polarization-scrambled single-channel 28 GBd PDM-16QAM signal, with a bit-error ratio (BER) below the hard decision forward error correction (HD-FEC) threshold in the back-to-back case as well as after transmission over 120 km standard single-mode fiber (SSMF) link.

BRIEF DESCRIPTION OF THE DRAWINGS

Embodiments of the present invention will be detailed subsequently referring to the appended drawings, in which:
FIG. 6 illustrates back to back (b2b) results of the validation, wherein

DETAILED DESCRIPTION OF THE INVENTION

Embodiments of the present invention are now described in more detail with reference to the accompanying drawings in which the same or similar elements have the same reference signs assigned.

Figure 2:
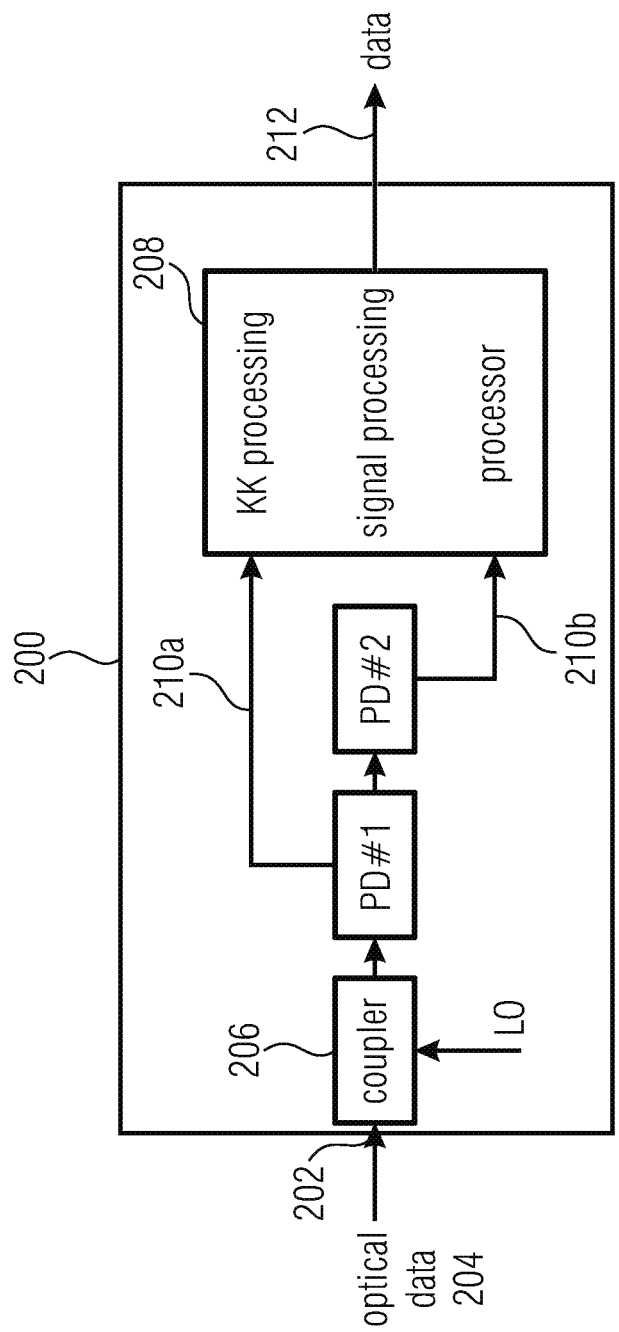

FIG. 2 schematically illustrates the architecture of a polarization-diverse Kramers-Kronig heterodyne receiver 200 according to embodiments of the present invention. The receiver 200 includes an input 204, combiner 206, like an optical coupler, a first optical detector PD #1, a second optical detector PD #2, and a processor 208. The first and second optical detectors PD #1, PD #2 are concatenated or connected in series, e.g., serially cascaded polarization-selective photodiodes.

The input 202 receives a modulated optical data signal 204. The modulated optical data signal 204 includes components of a plurality of polarizations, and the plurality of polarizations include at least a first polarization and a second polarization. According to embodiments, the signal 204 may be an optical dual polarization (DP) signal carrying the data. The first optical detector PD #1 is coupled to the input 202 to receive the modulated optical data signal 204. The first optical detector (PD #1) is polarization-selective or polarization-sensitive to the first polarization and passes components of the modulated optical data signal 204 having the second polarization. The first optical detector PD #1 outputs a first electrical signal 210a. The second optical detector PD #2 is coupled to the first optical detector PD #1 and receives from the first optical detector PD #1 the components of the modulated optical data signal having the second polarization. The second optical detector PD #2 outputs a second electrical signal 210b. The processor 208 applies a Kramers-Kronig, KK, process to the first electrical signal 210a and to the second electrical signal 210b, and outputs the data signal 212 using the KK processed first and second electrical signals. The combiner 206 is connected between the input 202 and the first optical detector PD #1. The combiner 206 combines the modulated optical data signal 204 with an unmodulated optical signal LO such that the unmodulated optical signal LO serves as a KK carrier for the first and second polarizations.

Figure 1:
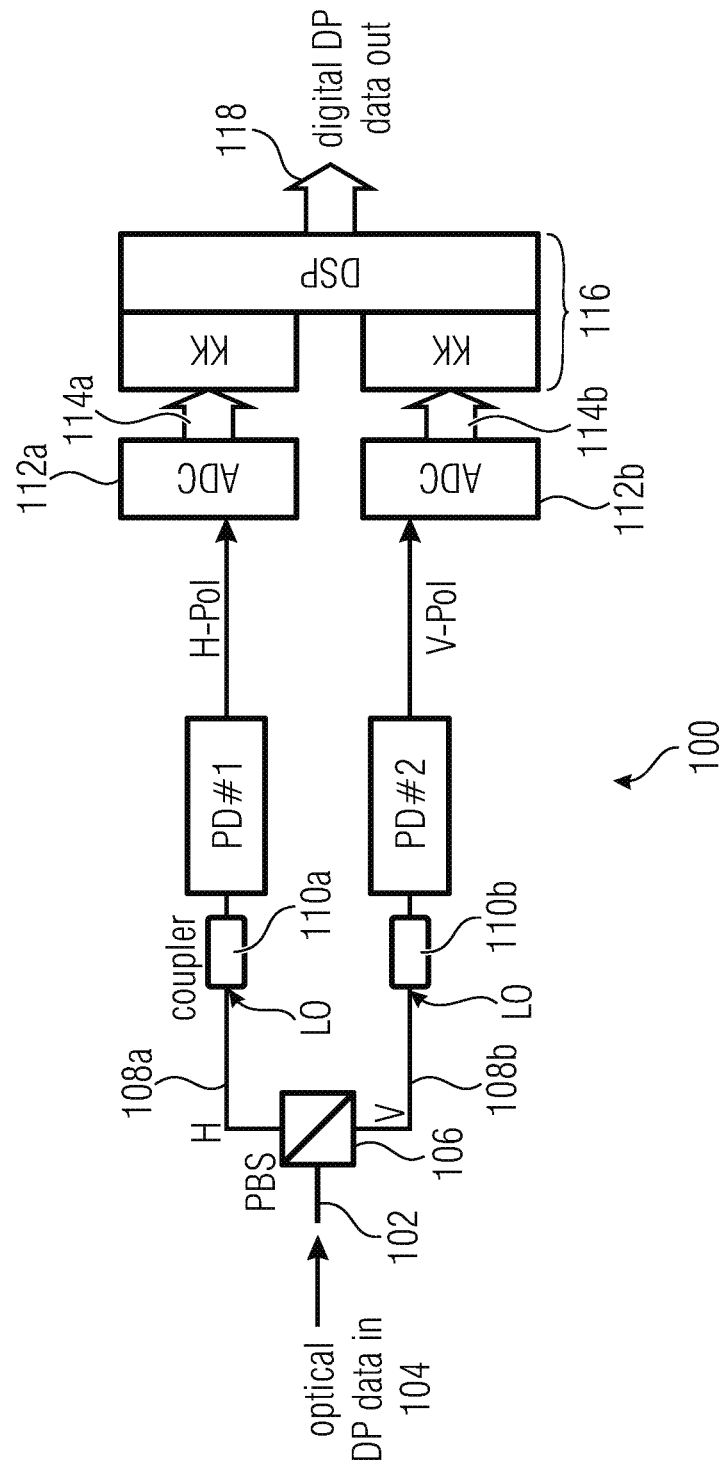
FIG. 1 schematically illustrates a conventional architecture of a polarization-diverse Kramers-Kronig heterodyne receiver,
FIG. 2 schematically illustrates the architecture of a polarization-diverse Kramers-Kronig heterodyne receiver according to embodiments of the present invention.

The above described architecture is advantageous over conventional approaches as the number of discrete elements may be reduced, e.g., there is no need for providing a discrete PBS to separate the polarization components. The separation occurs in the first optical detector PD #1 that is polarization-selective or polarization-sensitive to the first polarization and passes components of the modulated optical data signal 204 having the second polarization to the second optical detector PD #2. Also no separate combiners are needed, rather a single combiner is used. Thus, costs, overhead and footprint of the receiver are reduced when compared to a conventional implementation, e.g., the one described above with reference to FIG. 1. In accordance with embodiments, the discrete elements may be mounted on a common substrate, e.g., a printed circuit board, to which the combiner 206, the first optical detector PD #1, the second optical detector PD #2 and the processor 208 forming the polarization-diverse Kramers-Kronig heterodyne receiver 200 are mounted. The input 202, which is an optical input, the combiner 206, the first optical detector PD #1 and the second optical detector PD #2 may be connected by respective optical waveguides or other lines for transmitting an optical signal. The first optical detector PD #1, the second optical detector PD #2, the processor 208 and the output 212 may be connected by respective electrical lines, like printed conductors, or other lines for transmitting an electrical signal.

In accordance with embodiments, the combiner 206 combines the modulated optical data signal 204 with an unmodulated optical signal LO under a predefined polarization angle with respect to the first and second polarizations such that an intensity or a power of the unmodulated optical signal LO is substantially the same for the first and second polarizations. The receiver may also include a local optical source connected to the combiner 206 which provides the unmodulated optical signal LO.

In accordance with embodiments, the second optical detector PD #2 is polarization insensitive, i.e., the second optical detector PD #2 converts light of any polarization into the electrical signal 210b. Since most of the light having the first polarization is already filtered by the first optical detector PD #1, the second optical signal 210b is mainly associated with the second polarization. In accordance with yet other embodiments, the second optical detector PD #2 may be polarization selective to the second polarization. The first polarization may be a horizontal H polarization or a transverse electric TE polarization, and the second polarization may be a vertical V polarization or a transverse magnetic TM polarization.

In accordance with other embodiments, the optical detectors PD #1 and PD #2 may be photodetectors, like photodiodes, e.g., serially cascaded photodiodes, which are waveguide-integrated on a single chip. In accordance with further embodiments, other optical detectors may be employed. Basically, any device converting an optical signal into an electrical signal may be employed, e.g., an optical receiver.

Figure 3:
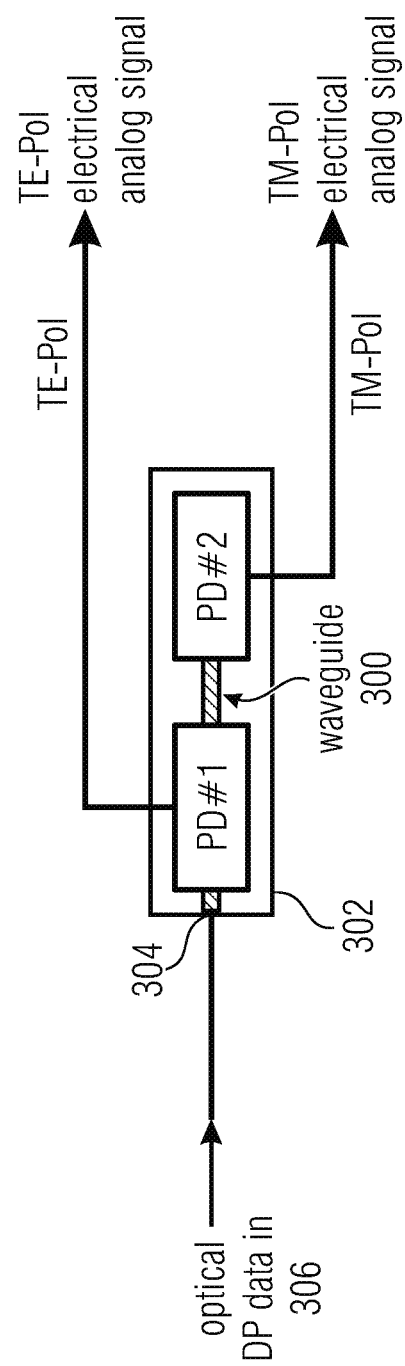
FIG. 3 illustrates a waveguide-integrated polarization-selective dual-photodetector according to reference [5]

In the following further embodiments of the present invention will be described using serially cascaded photodiodes waveguide-integrated on a single chip, e.g., a monolithically integrated DP-KK receiver architecture which allows for further reducing the footprint significantly. For example, in accordance with embodiments, a polarization-selective waveguide-integrated photodetector as described in reference [5] may be used. FIG. 3 illustrates a waveguide-integrated polarization-selective dual-photodetector chip 302 according to reference [5]. The waveguide 300 mainly connects two serially cascaded photodiodes PD #1 and PD #2 which are waveguide-integrated on a single chip 302 with a single optical input 304. The first photodiode or photodetector PD #1 is polarization selective, e.g., to a transverse electric (TE) polarization component with respect to the waveguide 300. The second photodiode or photodetector PD #2 may be polarization-insensitive or it may be polarization selective to the orthogonal polarization component, e.g., to the transverse magnetic TM polarization component. Responsive to an optical DP data signal 306 applied to the input 304 of the waveguide 300, the first photodiode PD #1 generates an electrical signal TE-Pol responsive to the TE polarization component in the input signal 306, and the second photodiode PD #2 generates an electrical signal TM-Pol responsive to the TM polarization component in the input signal 306.

Figure 4:
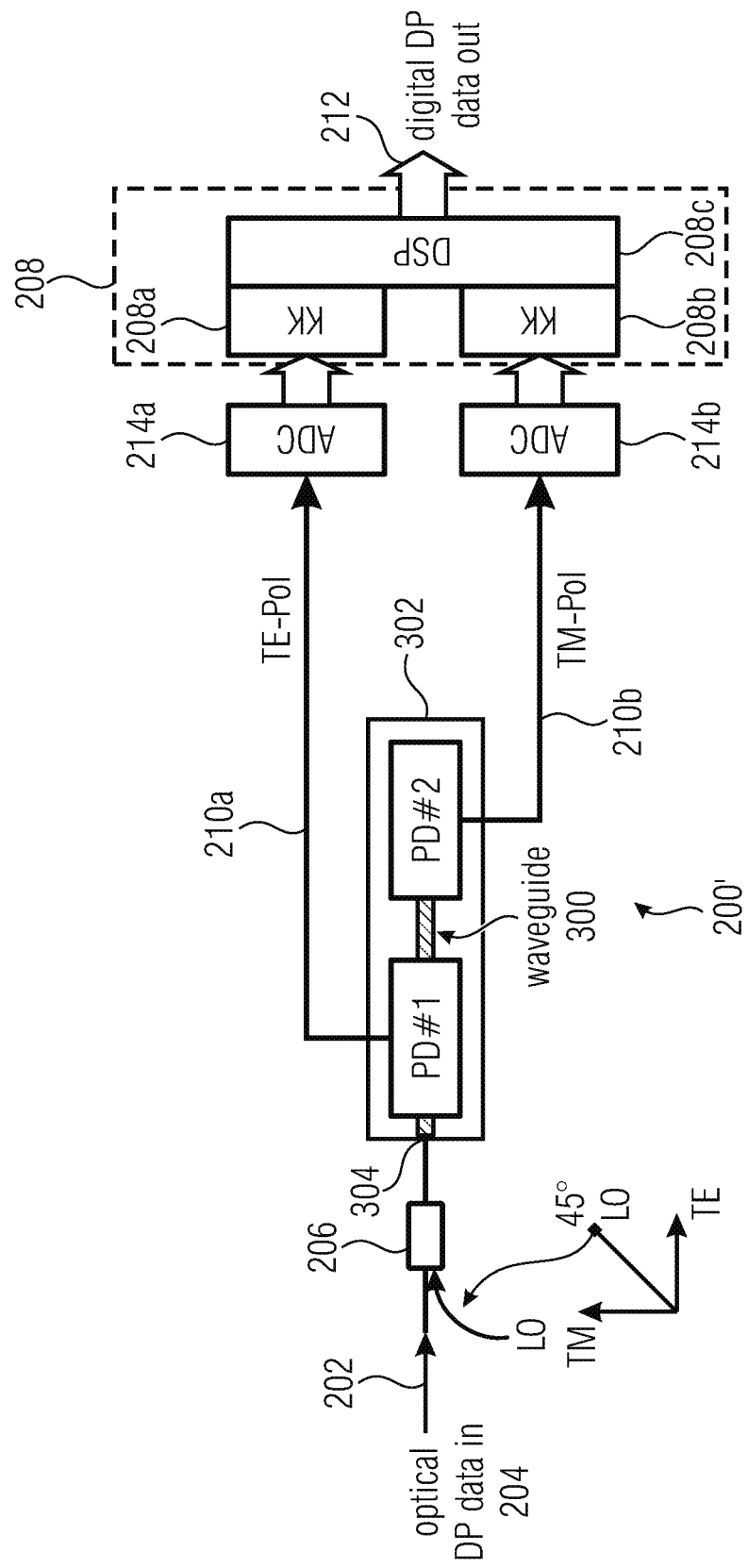
FIG. 4 illustrates an embodiment of a polarization-diverse Kramers-Kronig heterodyne receiver using serially cascaded photodiodes waveguide-integrated on a single chip.

FIG. 4 illustrates an embodiment of a polarization-diverse Kramers-Kronig heterodyne receiver 200' using a serially cascaded photodiodes waveguide-integrated on a single chip, like the one described with reference to FIG. 3. When compared to the embodiment of FIG. 2, in the integrated polarization-diverse Kramers-Kronig heterodyne receiver 200' the optical detectors PD #1 and PD #2 are realized by serially cascaded photodiodes that are waveguide-integrated on the single chip 302. In addition, the KK processes or receivers 208a and 208b as well as the further signal processing 208c as provided by the processor 208 are depicted. Since the signals 201a/TE-Pol and 210b/TM-Pol output by the respective optical detectors PD #1 and PD #2 are analog signals, respective analog-to-digital converters, ADCs, 214a, 214b are connected between the optical detectors PD #1 and PD #2 and the processor 208.

According to the embodiment of FIG. 4, a polarization-diversity Kramers-Kronig heterodyne receiver architecture is provided in which the combiner 206 is used to combine the modulated optical input data signal 204 with the unmodulated light from a local oscillator laser such that the unmodulated optical signal serves as a KK carrier for the first and second polarizations TE, TM. The combiner 206 may combine the modulated optical data signal 204 with the unmodulated optical signal under a predefined polarization angle, e.g., 45°, with respect to the first and second polarizations TE, TM such that an intensity or a power of the unmodulated optical signal is substantially the same for the first and second polarizations TE, TM. In other words, the combiner 206 is used to combine the modulated optical input data signal 204 with the unmodulated light from the oscillator laser LO under 45° polarization angle with respect to a waveguide polarization axes of the waveguide-integrated polarization-selective dual-photodetector chip 302. The first photodetector PD #1 is polarization selective, e.g., to the transverse electric (TE) polarization component with respect to the waveguide 300. The first photodetector PD #1, thereby, inherently serves as the PBS for the polarization-diversity Kramers-Kronig heterodyne architecture 200'. The unmodulated LO light may be fed into the input 304 of the chip 302 under a 45° polarization angle with respect to polarization axes of the waveguide 300 so that the light serves as LO for both polarizations.

The two electrical analog photodetector outputs TE-Pol, TM Pol are digitized by the two analog-to-digital converters 214a, 214b whose two digitized output signals are individually processed in two first Kramers-Kronig (KK) digital signal processors (DSP) 208a, 208b. The KK DSP's 208a, 208b remove distortions from signal-signal beating in the heterodyne receiver architecture. The two output digital waveforms from the KK DSPs 208a, 208b are then fed as two inputs into the subsequent second DSP 208c for polarization separation and the like. The second DSP 208c may also perform further functions like equalization of transmitter and channel impairments including chromatic dispersion compensation, carrier phase recovery, demodulation, etc.

The inventive DP-KK receiver architecture has been validated using the embodiment described with reference to FIG. 4 used for receiving a 224-Gb/s dual-polarization data signal (28-GBd PDM-16QAM). After transmission over a 120-km standard single-mode fiber (SSMF) link, the bit-error ratio (BER) performance is found to be below the hard-decision forward-error correction (HD-FEC) threshold, resulting in a net data rate of 200-Gb/s.

Figure 5:
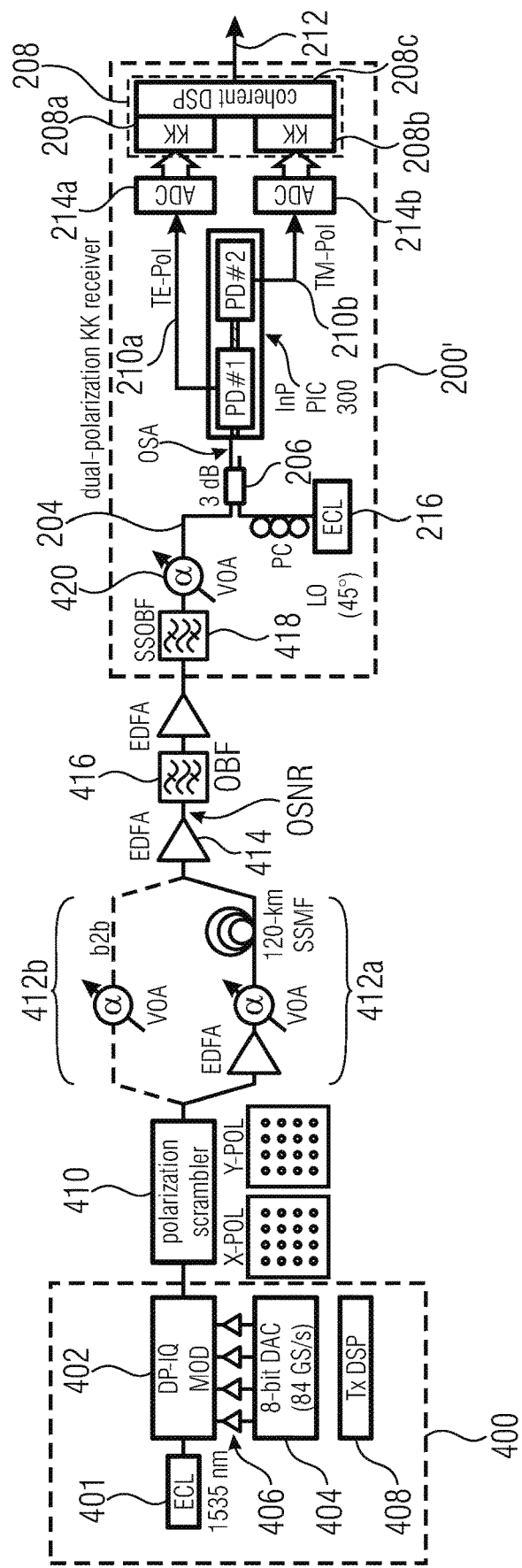
FIG. 5 illustrates the experimental setup for validating the polarization-diversity Kramers-Kronig heterodyne receiver architecture of FIG. 4.

FIG. 5 illustrates the experimental setup for validating the polarization-diversity Kramers-Kronig heterodyne receiver architecture 200' of FIG. 4. At a transmitter 400, an external cavity laser (ECL, 1535 nm) 401 is modulated by a dual-polarization IQ-modulator 402 driven by a 4-channel 8-bit 84 GS/s digital-to-analog converter (DAC) 404 via four driver amplifiers 406. The DAC waveforms are generated by an offline transmitter digital signal processing (Tx-DSP) 408 which includes the insertion of training symbols for a channel estimation (CAZAC 64), a root-raised cosine pulse shaping (10% roll-off) and a linear pre-distortion of the DAC 404, the driver 406 and the modulator 402. The transmitter 400 is programmed to generate a 28 GBd PDM 16QAM data signal with a line rate of 224 Gb/s.

At the output of the transmitter 400, a fast polarization scrambler 410 is used to randomize the state-of-polarization of the signal before sending it either over a 120-km SSMF link 412a or through a back to back (b2b) branch 412b in which a variable optical attenuator (VOA) in front of an Erbium-doped amplifier (EDFA) is used to emulate variable link loss and thereby degradation of the received optical signal-to-noise ratio (OSNR). In the transmission path 412a, a VOA after an EDFA is used to vary the fiber launch power. After an Erbium-doped fiber amplifier (EDFA) 414, an optical band-pass filter (OBF) 416 removes the out-of-band amplified spontaneous noise (ASE). At the input of the DP-KK receiver subsystem 200', a single-sideband optical band-pass filter (SSOBF) 418 is provided to avoid violating the single-sideband condition (see reference [1]). A subsequent VOA 420 is used to adjust the carrier-to-signal power ratio (CSPR) with respect to the KK carrier (LO), which is generated from an ECL 216 (e.g., 1534.87 nm, i.e. 1.8 GHz frequency offset from the edge of the data signal) and combined with data signal using a 3 dB coupler 206. In accordance with embodiments, the polarization-diversity Kramers-Kronig heterodyne receiver architecture 200' of FIG. 4 may include the LO optical source, e.g., by a co-integration of the local oscillator (LO) laser 216 allowing for even more cost-efficient data center interconnects.

To validate the integrated DP-KK architecture an Indium Phosphide photonic-integrated circuit (InP PIC) 302 is used in which PD #1 is a polarization-selective multi quantum well diode and PD #2 is a polarization-insensitive PIN diode (see reference [5]). The output of the 3-dB coupler 206 is fiber-coupled to the PIC waveguide 300 and the electrical PD output signals 210a, 210b are tapped by two RF on-waver probes and digitized by two analog-to-digital converters (ADC, 100 GS/s, 33 GHz) 214a, 214b. An offline KK-DSP is performed separately per polarization branch at a sampling rate of 112 GS/s. As the used on-chip PDs PD #1, PD #2 are AC-coupled, the KK carrier is digitally added in the KK-DSP 208a, 208b (see reference [6]). A conventional coherent dual-polarization DSP 208c is applied which includes data-aided channel estimation, frequency domain MIMO equalization, blind phase search carrier phase recovery, compensation of residual modulator I/Q imbalances and phase errors using a real-valued MIMO time-domain equalizer (101 taps) before de-mapping and BER counting. The BER is converted to the $Q^2$-factor using:

$$Q^2_{dB}=20\log_{10}[\sqrt{2}\text{erfc}^{-1}(2\cdot\text{BER})]$$

Figure 6B:
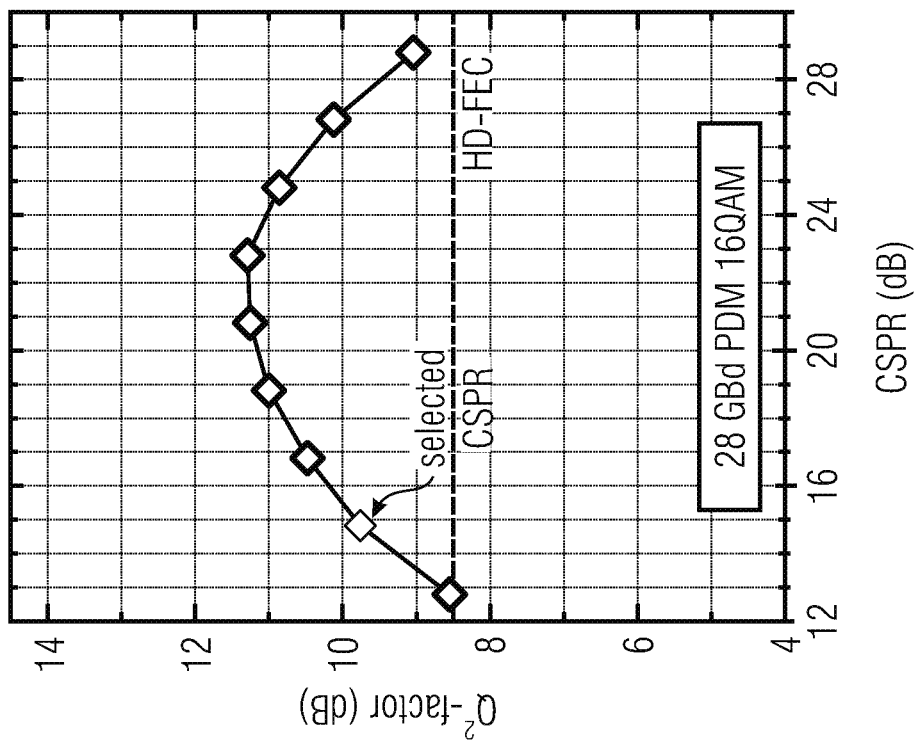
FIG. 6(b) illustrates the $Q^2$-factor vs. CSPR plot.
Figure 6A:
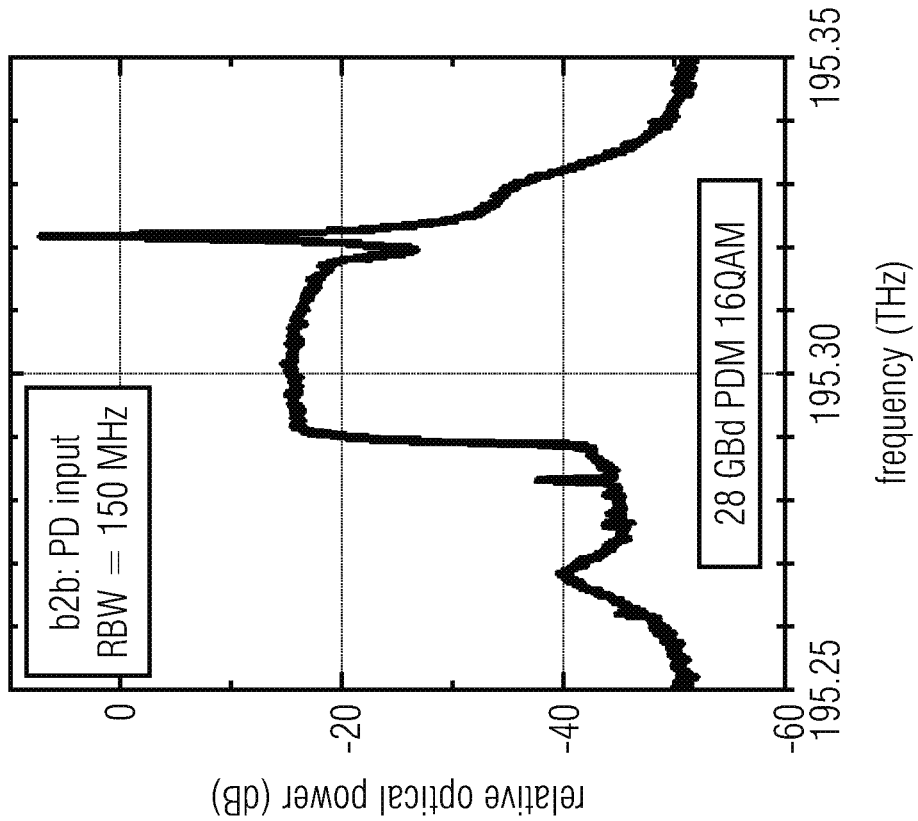
FIG. 6(a) illustrates the optical spectrum at the input of the KK receiver at a resolution bandwidth of 150 MHz.
Figures 6C, 6D:
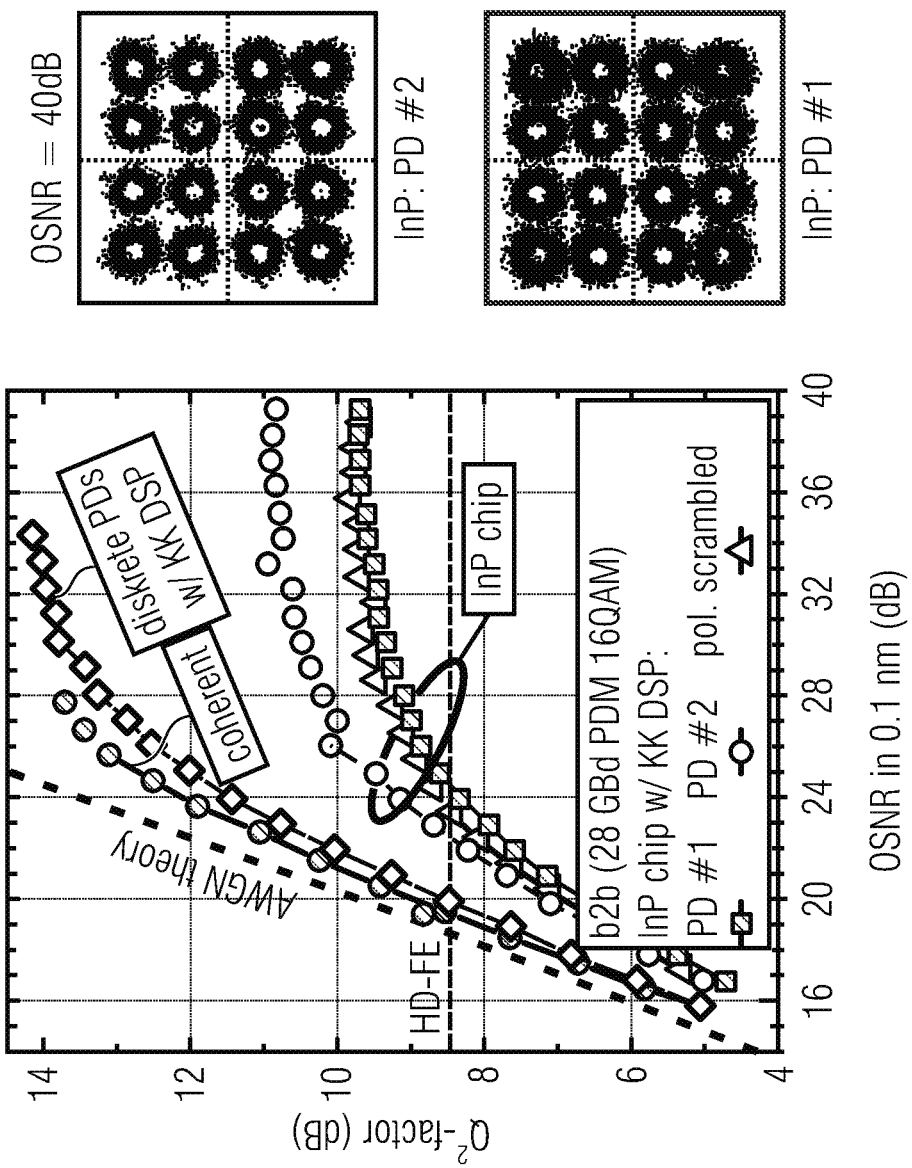
FIG. 6(c) illustrates the $Q^2$-factor performance for the different receiver architectures for (i) a coherent reception, (ii) a conventional DP KK with discrete PDs (see FIG. 1), and (iii) a DP-KK according to embodiments of the invention with the integrated dual-PDs on the InP chip (PD #1=, PD #2=O, polarization (pol.) scrambled=Δ)
FIG. 6(d) illustrates the constellations of the integrated photodiodes PD #1, PD #2 at 40 dB OSNR.

The results of the validation performed using the setup in FIG. 5 are now described and discussed with reference to FIG. 6 illustrating the back to back (b2b) results, wherein FIG. 6(a) illustrates the optical spectrum at the input of the KK receiver 200' at a resolution bandwidth of 150 MHz, FIG. 6(b) illustrates the $Q^2$-factor vs. CSPR plot, FIG. 6(c) illustrates the $Q^2$-factor performance for the different receiver architectures for (i) a coherent reception, (ii) a conventional DP KK with discrete PDs (see FIG. 1), and (iii) a DP-KK 200' according to embodiments of the invention with the integrated dual-PDs on the InP chip 302 (PD #1=☐, PD #2=O, Polarization (pol.) scrambled=Δ), and FIG. 6(d) illustrates the obtained constellations from the integrated photodiodes PD #1, PD #2 at 40 dB OSNR.

FIG. 6(a) shows the optical spectrum at the input 204 of the DP KK receiver (InP PIC) 200' as measured using an optical spectrum analyzer (OSA) with a 150 MHz resolution bandwidth. Due to the finite steepness of the used SSOBF, the filter 418 is allowed to crop the data signal spectrum at the benefit of a better noise reduction at frequencies beyond the KK carrier.

In any KK receiver, the magnitude of the received CSPR is a critical parameter that may severely affect the performance of the receiver (see references [1], [7]). Thus, a CSPR sweep is conducted. FIG. 6(b) shows the obtained $Q^2$-factor vs. CSPR. At high CSPRs, the observed degradation is due to an increased shot noise from the high KK carrier power (see reference [2]), whereas the degradation at lower CSPR is due to violating the minimum phase condition (see reference [1]). The $Q^2$-factors are above the HD FEC threshold ($Q^2$-factor=8.5 dB, BER of $3.8\times10^{-3}$) over a wide range of CSPRs from 13 dB to 29 dB. Thus, a CSPR of 14.9 dB is used for all the subsequent measurements.

As a reference for the KK measurements, the performance using a standard dual polarization coherent receiver is now discussed. FIG. 6(c) shows the $Q^2$-factor vs. OSNR plot. The obtained performance of the coherent receiver is shown as circular symbols labeled "coherent" in FIG. 6(c). An OSNR implementation penalty of ~0.8 dB may be observed with respect to the additive white Gaussian noise (AWGN) theory at $Q^2$-factor=8.5 dB (HD FEC threshold).

The performance using the conventional DP-KK receiver based on discrete PDs (see FIG. 1) is now discussed. It is noted that for the measurements the LO is coupled to the data signal 102 before the PBS 106, and the PBS 106 splits the orthogonal polarizations of both the PDM data 102 and the KK carrier so as to be placed at 45° polarization angle with respect to the PBS axis. This is achieved by manipulating the polarization controller (PC) in the path of the LO (with the data signal turned off) with the aim of obtaining same photocurrents from the two PDs to compensate for the different responsivities of both polarizations. The performance of the DP-KK based on the discrete PDs (with PBS) is shown as diamond symbols in FIG. 6(c). The measured penalty (compared to the coherent reception) is <0.5 dB at the HD-FEC threshold.

Now the performance of a DP-KK receiver 200' based on the integrated chip 300 in accordance with embodiments of the invention is discussed. Initially, a pair of driver amplifiers 406 in the transmitter 400 and the polarization scrambler 410 in front of the transmitter 400 are turned off. The generated single-polarization data is aligned to PD #1 of the InP chip 302, and then all the driver amplifiers 406 are turned on to allow sending a PDM data to the receiver 200'. The KK carrier (LO) is placed at a polarization angle of 45° with respect to the waveguide 300 so as to obtain same photocurrents from PD #1 and PD #2 as indicated in FIG. 4 and FIG. 5. The obtained $Q^2$-factor vs. OSNR for the PDs PD #1 and PD #2 are also shown in FIG. 6(c). It may be seen that PD #1 (square symbols) shows a degraded performance compared to PD #2 (circular symbols O), which is attributed to a limited bandwidth of the TE selective PD #1 in the specific PIC sample used here. Contrary to the coherent reception, the 3 dB electrical bandwidth of ~10 GHz of PD #1 is not sufficient to accommodate the full 30.8 GHz optical bandwidth of the data plus 1.8 GHz frequency offset of the KK carrier. The obtained constellations at 40 dB OSNR for PD #1 and PD #2 are shown in FIG. 6(d).

To investigate the polarization robustness of the DP KK receiver 200' based on the integrated InP chip 302, the polarization scrambler 410 in front of the transmitter 400 is turned on. The average $Q^2$ factor obtained from both PDs PD #1 and PD #2 on the chip 302 is plotted (triangular symbols A) in FIG. 6(c). The obtained performance is similar to the performance of PD #1. The worse BER dominates after a linear combination of the BERs of the PDs. Nevertheless, the performance of all the investigated cases of the InP-PIC 302 are better than the HD-FEC threshold.

Figure 7:
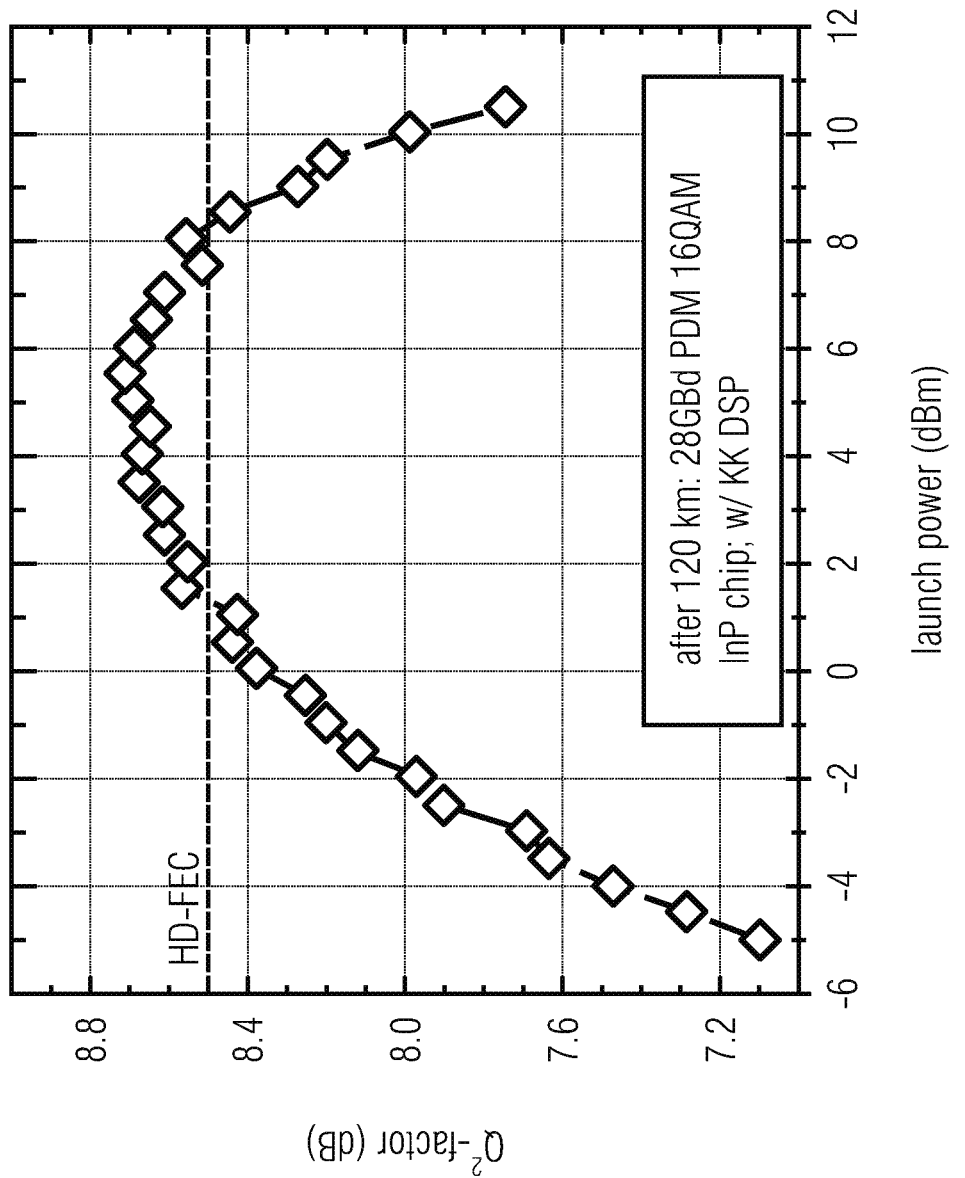
FIG. 7 illustrates the fiber launch power for a dual-polarization Kramers-Kronig reception according to FIG. 4.

Finally, the polarization scrambled 28 GBd PDM 16QAM data signal is transmitted over the 120-km SSMF link 412a, and is received with the integrated InP DP-KK receiver 200'. The $Q^2$ factor vs. the fiber launch power for the dual-polarization Kramers-Kronig reception using integrated InP chip for 200 Gbit/s net transmitted over 120 km SSMF is shown in FIG. 7. The launch powers ranging from +1.5 dBm to +8 dBm are found to be above the HD-FEC threshold. The optimum launch power is found to be +5.5 dBm at a maximum $Q^2$-factor of 8.7 dB, bringing ~0.2 dB Q-margin to the HD-FEC threshold. Thus, the inventive dual polarization Kramers-Kronig (KK) receiver architecture has a significantly reduced footprint, based on two concatenated polarization-selective photodiodes without the need for a PBS, and allows for an improved, polarization robust reception of optical data signals, independent on the polarization states of the optical signals. When using, according to embodiments, an indium phosphide photonic-integrated circuit (InP PIC), a polarization-scrambled signal, e.g., a polarization-scrambled single-channel 28 GBd PDM-16QAM signal, may be received with a bit-error ratio (BER) below the hard decision forward error correction (HD-FEC) threshold, e.g., in the back-to-back case as well as after transmission over a 120 km standard single-mode fiber (SSMF) link.

Figure 8:
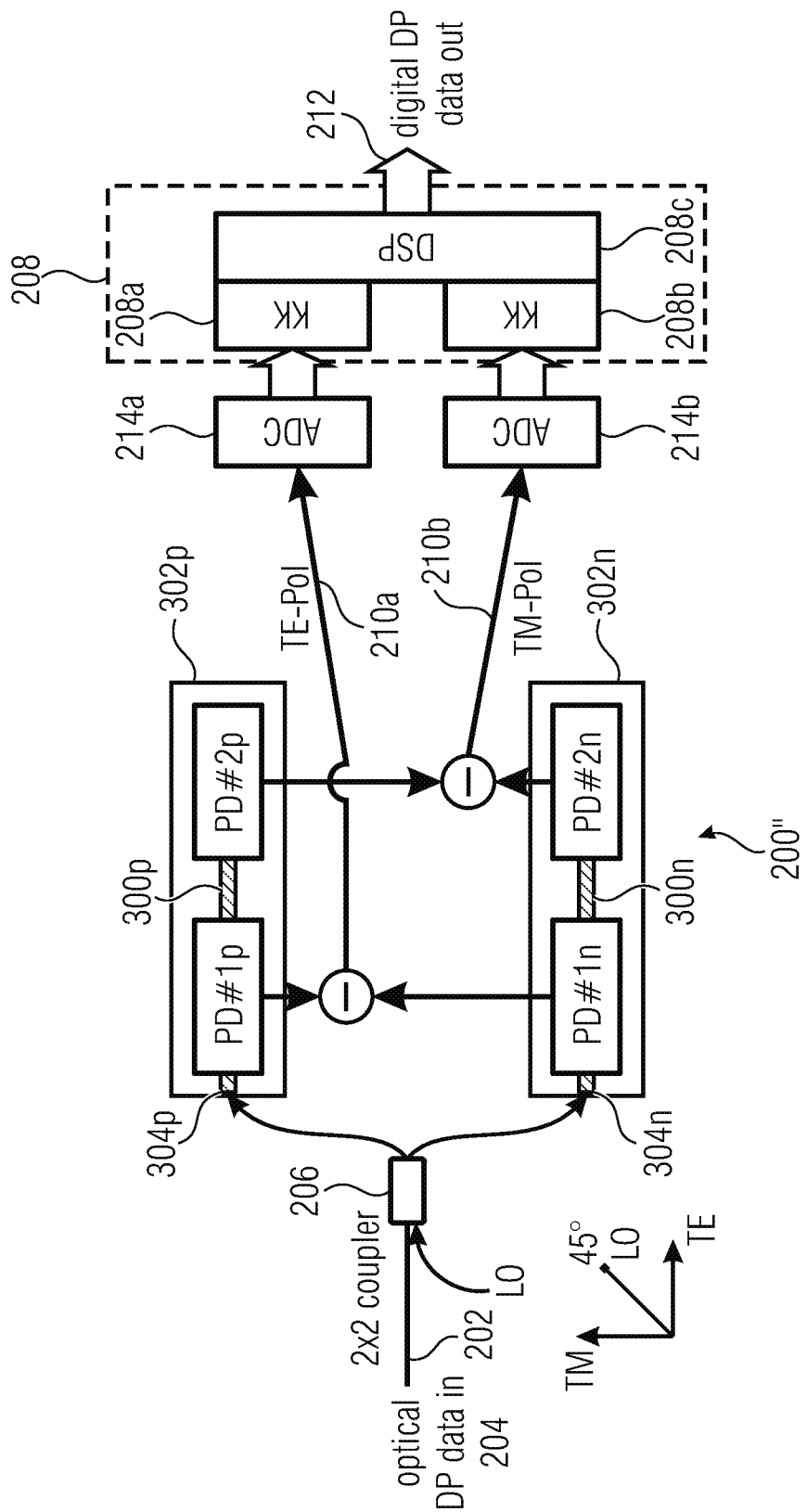
FIG. 8 illustrates a further embodiment of a polarization-diversity Kramers-Kronig heterodyne receiver in a balanced configuration.

FIG. 8 illustrates a further embodiment of a polarization-diversity Kramers-Kronig heterodyne receiver 200" in a balanced configuration using two serially cascaded photodiodes waveguide-integrated on respective chips, like the one described with reference to FIG. 3.

The polarization-diversity Kramers-Kronig heterodyne receiver 200" includes the input combiner 206 which is a 2-by-2 ("2×2") coupler. The two outputs of the 2×2 coupler 206 are connected to two waveguide-integrated polarization-selective dual-photodetector chips 302p, 302n, each having a structure as described with reference to FIG. 3. The two dual-photodetector chips 302p, 302n are indexed as "p" and "n" indicating that they generate linear mixing terms between the optical input data signal 204 and the local oscillator (LO) which are inverted (=180° out-of-phase) with respect to each other.

The outputs of each individual first and second photodetectors PD #1p, PD #1n and PD #2p, PD #2n, respectively, in each dual-photodetector chip 302p, 302n are electrically subtracted to obtain TE-pol and TM-pol signals 210a, 210b. As the signals from the photodetectors PD #1p, PD #1n and PD #2p, PD #2n, respectively, are inverted with respect to each other, the subtraction effectively doubles the amplitude of the mixing products and thereby increases the receiver sensitivity of this balanced configuration.

It is noted that in a balanced configuration as described with reference to FIG. 8, ideally, the mixing products of the optical data signal with itself ("signal-signal beating"), which are generated in each PD, cancel out each other. Thus, ideally, there would not be a need for a KK-DSP processing block, which actually removes the signal-signal beat term. However, e.g., due to fabrication tolerances with respect to photodetector responsivities, waveguide losses and the like, there is no true balanced configuration. Rather, any balanced configuration has some imbalance and for such an imbalanced set-up the KK-DSP 408a, 408b improves the performance of the overall receiver architecture as it removes remaining signal-signal beat terms.

In accordance with other embodiments, instead of providing the two serially cascaded photodiodes waveguide-integrated on separate chips, the two serially cascaded photodiodes may be waveguide-integrated on a single chip with two waveguides and two inputs (see for example reference [9]). The electrical subtraction may be done on-chip. In accordance with further embodiments, also the 2×2 coupler may be integrated.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 9:
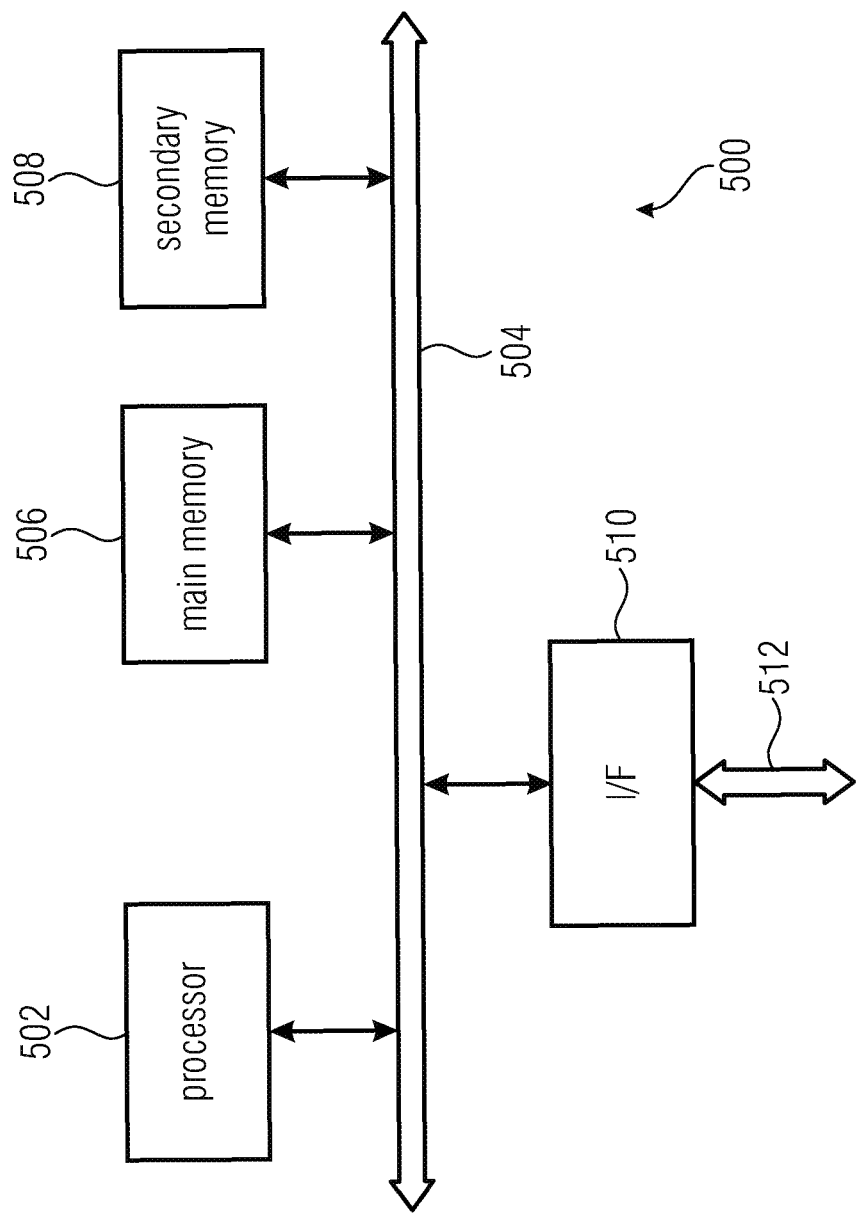
FIG. 9 illustrates an example of a computer system on which units or modules as well as the steps of the methods described in accordance with the inventive approach may execute.

Various elements and features of the present invention, like the processor 208, may be implemented in hardware using analog and/or digital circuits, in software, through the execution of instructions by one or more general purpose or special-purpose processors, or as a combination of hardware and software. For example, embodiments of the processor 208 of the present invention may be implemented in the environment of a computer system or another processing system. FIG. 9 illustrates an example of a computer system 500. The units or modules as well as the steps of the methods performed by these units may execute on one or more computer systems 500. The computer system 500 includes one or more processors 502, like a special purpose or a general purpose digital signal processor. The processor 502 is connected to a communication infrastructure 504, like a bus or a network. The computer system 500 includes a main memory 506, e.g., a random access memory (RAM), and a secondary memory 508, e.g., a hard disk drive and/or a removable storage drive. The secondary memory 508 may allow computer programs or other instructions to be loaded into the computer system 500. The computer system 500 may further include a communications interface 510 to allow software and data to be transferred between computer system 500 and external devices. The communication may be in the from electronic, electromagnetic, optical, or other signals capable of being handled by a communications interface. The communication may use a wire or a cable, fiber optics, a phone line, a cellular phone link, an RF link and other communications channels 512.

The terms "computer program medium" and "computer readable medium" are used to generally refer to tangible storage media such as removable storage units or a hard disk installed in a hard disk drive. These computer program products are means for providing software to the computer system 500. The computer programs, also referred to as computer control logic, are stored in main memory 506 and/or secondary memory 508. Computer programs may also be received via the communications interface 510. The computer program, when executed, enables the computer system 500 to implement the present invention. In particular, the computer program, when executed, enables processor 502 to implement the processes 208a to 208c of the present invention, such as any of the methods described herein. Accordingly, such a computer program may represent a controller of the computer system 500. Where the disclosure is implemented using software, the software may be stored in a computer program product and loaded into computer system 500 using a removable storage drive, an interface, like communications interface 510.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] Mecozzi, A., Antonelli, C., Shtaif, M.: 'Kramers-Kronig coherent receiver', Optica, 2016, 3, (11), pp. 1220-1227.

[2] Sackey, I., Elschner, R., Schmidt-Langhorst, C., et al.: '400-Gb/s single-photodiode polarization-agnostic KK reception of distributedly aggregated superchannel', Journal of Lightwave Technology, 2019, 37, (1), pp. 156-162, DOI: 10.1109/JLT.2018.2885173.

[3] Chen, X., Antonelli, C., Chandrasekhar, S., et al.: '4×240 Gb/s dense WDM and PDM Kramers-Kronig detection with 125-km SSMF transmission', Proc 43rd European Conference on Optical Communication (ECOC 2017), Gothenburg, Sweden, September 2017.

[4] Ferreras, O., Anton, F., Rodriguez, E., et al.: 'Compressive strained multiquantum-well waveguide photodetectors for coherent receivers', IEEE Photonics Technology Letters, 1995, 7, (5), pp. 546-548, DOI: 10.1109/68.384539.

[5] S. Keyvaninia et al., "Novel Photodetector Chip for Polarization Diverse Detection," DOI 10.1109/JLT.2019.2908247, Journal of Lightwave Technology

[6] Beckerwerth, T., Keyvaninia, S., Zhou, G., et al.: 'Advanced polarization diverse coherent receiver using waveguide integrated MQW photodiodes', Proc. Advanced Photonics, Zürich, Switzerland, July 2018.

[7] Zhu, M., Zhang, J., Ying, H., et al.: '56-Gb/s optical SSB PAM-4 transmission over 800-km using DDMZM transmitter and simplified direct detection Kramers-Kronig receiver', Proc. Optical Fiber Commun. Conf. (OFC), San Diego, Calif., March 2018.

[8] Li, Z., Erkilinç, S. M., Shi, K., et al.: 'Joint optimization of resampling rate and CSPR in direct-detection transmission over a single span of 200 km', Proc 43rd European Conference on Optical Communication (ECOC 2017), Gothenburg, Sweden, September 2017.

[9] R. J. Deri, E. C. M. Pennings, A. Scherer, A. S. Gozdz, C. Caneau, N. C. Andreadakis, V. Shah, L. Curtis, R. J. Hawkins, J. B. D. Soole, and J.-I. Song, "Ultracompact Monolithic Integration of Balanced, Polarization Diversity Photodetectors for Coherent Lightwave Receivers", pages 1238-1240, IEEE PHOTONICS TECHNOLOGY LETTERS, VOL. 4, NO. 11, NOVEMBER 1992.

The invention claimed is:

1. An apparatus, comprising
an input configured to receive a modulated optical data signal, the modulated optical data signal comprising components of a plurality of polarizations, the plurality of polarizations comprising at least a first polarization and a second polarization,
a first optical detector coupled to the input to receive the modulated optical data signal, wherein the first optical detector is polarization-selective or polarization-sensitive to the first polarization and passes components of the modulated optical data signal comprising the second polarization, and wherein the first optical detector is configured to output a first electrical signal,
a second optical detector coupled to the first optical detector to receive from the first optical detector the components of the modulated optical data signal comprising the second polarization, wherein the second optical detector is configured to output a second electrical signal, and
a processor, the processor configured to
apply a Kramers-Kronig, KK, process to the first electrical signal and to the second electrical signal, and output a data signal using the KK processed first and second electrical signals,
wherein a combiner, like an optical coupler, is connected between the input and the first optical detector, the combiner configured to combine the modulated optical data signal with an unmodulated optical signal so that the unmodulated optical signal serves as a KK carrier for the first and second polarizations.

2. The apparatus of claim 1, wherein the combiner is configured to combine the modulated optical data signal with the unmodulated optical signal under a predefined polarization angle, e.g., 45°, with respect to the first and second polarizations so that an intensity or a power of the unmodulated optical signal is the same for the first and second polarizations.

3. The apparatus of claim 1, comprising a local optical source connected to the combiner and configured to provide the unmodulated optical signal.

4. The apparatus of claim 1, wherein the second optical detector is polarization selective or polarization insensitive to the second polarization.

5. The apparatus of claim 1, comprising a waveguide-integrated polarization-selective dual-photodetector chip comprising the first and second optical detectors, like photodiodes.

6. The apparatus of claim 5, wherein the combiner is configured to combine the modulated optical data signal with the unmodulated light under a predefined polarization angle, like 45°, with respect to waveguide polarization axes of the waveguide-integrated polarization-selective dual-photodetector chip.

7. The apparatus of claim 1, wherein
the first optical detector further comprises a first detector, like a photodiode, outputting a first signal and a second detector, like a photodiode, outputting a second signal
the second optical detector further comprises a third detector, like a photodiode outputting a third signal, and a fourth detector, like a photodiode, outputting a fourth signal,
the first detector and the second detector are connected in a balanced configuration to subtract the first signal and the second signal so as to provide the first electrical signal,
the third detector and the fourth detector are connected in a balanced configuration to subtract the third signal and the fourth signal so as to provide the second electrical signal, and
the combiner for combining the modulated signal with the unmodulated signal is configured to comprise two outputs each feeding the first and third detectors and the second and fourth detectors, respectively.

8. The apparatus of claim 7, comprising
a first waveguide-integrated polarization-selective dual-photodetector chip further comprising the first and third detectors, like photodiodes, and
a second waveguide-integrated polarization-selective dual-photodetector chip further comprising the second and fourth detectors, like photodiodes,
wherein the combiner comprising two outputs is connected to the first and second waveguide-integrated polarization-selective dual-photodetector chips, respectively.

9. The apparatus of claim 8, wherein the combiner is configured to combine the modulated optical data signal with the unmodulated light under a predefined polarization angle, like 45°, with respect to waveguide polarization axes of the first and second waveguide-integrated polarization-selective dual-photodetector chips.

10. The apparatus of claim 1, wherein the first polarization is a horizontal polarization or a transverse electric polarization, and wherein the second polarization is a vertical polarization or a transverse magnetic polarization.

11. The apparatus of claim 1, wherein the first electrical signal and the second electrical signal are analog signals, and wherein the apparatus further comprises a first analog-digital-converter connected between the first optical detector and a first KK receiver, and a second analog-digital-converter connected between the second optical detector and a second KK receiver.

12. The apparatus of claim 11, wherein the processor is configured to apply a coherent dual-polarization digital signal processing to the signals from the first and second KK receivers, and wherein the coherent dual-polarization digital signal processing may comprise one or more of the following:
- a polarization separation,
- a channel estimation, e.g., blind or data-aided,
- a multiple-input-multiple-output, MIMO, equalization, e.g. in a time domain or in a frequency domain,
- a carrier phase recovery, e.g., a blind phase search or a Viterbi-Viterbi phase recovery,
- a compensation of residual modulator I/O imbalances and phase errors using a real-valued MIMO time-domain equalizer,
- a symbol-to-bit de-mapping.

13. A method, comprising
- receiving a modulated optical data signal, the modulated optical data signal comprising components of a plurality of polarizations, the plurality of polarizations comprising at least a first polarization and a second polarization,
- combining the modulated optical data signal with an unmodulated optical signal so that the unmodulated optical signal serves as a Kramers-Kronig, KK, carrier for the first and second polarizations,
- applying the modulated optical data signal to a first optical detector to acquire a first electrical signal, the first optical detector being polarization-selective or polarization-sensitive to the first polarization and passing components of the modulated optical data signal comprising the second polarization,
- applying the components of the modulated optical data signal comprising the second polarization from the first optical detector to a second optical detector to acquire a second electrical signal,
- applying the first electrical signal to a first Kramers-Kronig, KK, receiver and the second electrical signal to a second KK receiver, and
- processing signals form the first and second KK receiver to output a data signal.

* * * * *